United States Patent [19]

Hagler, Jr.

[11] 4,410,430
[45] Oct. 18, 1983

[54] STACKED-DISC STRUCTURE FOR FLUID FILTER OR VALVE SILENCER

[75] Inventor: Ray Hagler, Jr., Valencia, Calif.

[73] Assignee: California Institute of Technology, Pasadena, Calif.

[21] Appl. No.: 277,064

[22] Filed: Jun. 24, 1981

Related U.S. Application Data

[63] Continuation-in-part of Ser. No. 262,541, May 11, 1981, abandoned.

[51] Int. Cl.³ .............................................. B01D 25/18
[52] U.S. Cl. .................................. 210/446; 137/625.3; 137/625.37; 138/42; 210/429; 210/450; 210/488
[58] Field of Search ........................ 137/625.3, 625.37; 138/38, 42; 210/446, 450, 451, 488, 498, 429–432

[56] References Cited

U.S. PATENT DOCUMENTS

| | | | |
|---|---|---|---|
| 2,692,685 | 10/1954 | Garland | 210/488 |
| 2,788,128 | 4/1957 | Heine | 210/446 |
| 3,397,794 | 8/1968 | Toth et al. | 210/488 |
| 3,648,843 | 3/1972 | Pearson | 210/443 |
| 3,827,568 | 8/1974 | Toth et al. | 210/448 |
| 3,894,716 | 7/1975 | Barb | 137/625.37 |
| 4,050,479 | 9/1977 | Baumann | 138/42 |
| 4,060,099 | 11/1977 | Bates | 137/625.3 |
| 4,079,754 | 3/1978 | Porter | 138/42 |
| 4,127,146 | 11/1978 | Self | 137/625.37 |
| 4,267,045 | 5/1981 | Hoof | 210/488 |

OTHER PUBLICATIONS

"Machine Design," vol. 46, No. 23, Sep. 19, 1974.

Primary Examiner—Peter A. Hruskoci
Attorney, Agent, or Firm—Freilich, Hornbaker, Wasserman, Rosen & Fernandez

[57] ABSTRACT

A stacked-disc structure is comprised of a stack of annular discs (13) scalloped along the outer edge to provide lobes (13a) and etched on one side to provide lands (13a). A web (13d) is retained in the lobes to strengthen the discs so that they will not collapse due to high fluid pressure. The stack of discs is retained by a housing (10) having a fluted interior wall to retain the ends of the lobes. End plates (11 and 12) secure the stack of discs with a spacer (14) at one end having lands (14a) on lobes which match the lobes of the stacked discs to allow fluid to flow into, or out of, the spaces between the lobes of the stacked discs. The spaces between the lands on the etched discs provide passages for fluid flow into or out of the hollow core of the stack. The height of the lands (i.e., depth of the etch) determines the size of the smallest particle that will be permitted to flow through. The stacked-disc structure may be connected to the inlet of a valve, or be incorporated into the valve housing on the inlet side of the valve seat to assure substantially constant fluid velocity, and thereby reduce valve noise when the valve is operated.

10 Claims, 11 Drawing Figures

STACKED-DISC STRUCTURE FOR FLUID FILTER OR VALVE SILENCER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This application is a continuation-in-part of application Ser. No. 262,541 filed May 11, 1981, now abandoned.

The present invention relates to a stacked-disc structure which may be used as a filter for extracting fine particle contamination from a fluid stream, or as a silencer for valves which control a fluid stream.

The usual practice in filtering a fluid stream is to pass the fluid through a fine mesh screen, with the size of the mesh selected for the maximum size of particles to be allowed to pass. While very fine mesh can be produced from material of natural or synthetic filaments, a problem arises in the case of filtering highly corrosive fluids, such as liquid fluorine. The filaments of such a fine mesh quickly corrode, and the entire screen fails. It is therefore necessary to use noncorrodible material for the screen, such as nickel alloy wire for filtering liquid fluorine. The problem with such a wire mesh screen is that the wire must then be very fine. It is extremely difficult, if not impossible, to weave a fine mesh screen with such wire.

A better approach is to stack etched annular discs as disclosed in U.S. Pat. Nos. 3,648,843; 3,397,794 and 3,827,568. Each filter disc is etched on only one side. When the etched face of the disc is pressed against the reverse side (unetched back) of another filter disc, restricted fluid passageways are formed by the etched channels. The passageways are so tortuous as to cause the fluid flow to change directions a number of times in flowing from the outside of the annular discs to the inside.

In the first of the above-mentioned patents, there is a central core on which annular filter discs are stacked. Each disc is etched with a pattern of baffles to provide a serpentine path for fluid flowing through four spaced openings on the outer edge of the disc into the baffled area, and through four spaced openings on the inner edge of the disc into spaces between the stack of discs and a core. The baffles cause the fluid to experience numerous changes in direction in following the serpentine path. This subjects the particles to inertial forces at each turn which drive the particles against lateral surfaces for separation from the moving fluid stream.

While this arrangement is effective in removing particles from the fluid, it does slow down the fluid flow significantly because it requires many changes in direction. This produces an undesirable pressure drop. This is further aggravated by the fact that the arrangement can provide for only limited inlet and outlet areas since most of the inner and outer circumferences of the annular discs are necessarily devoted to setting up the serpentine paths.

In the third of the above-mentioned patents the center core is eliminated, and the stacked filter discs are retained only at their outer edges. Also, the long serpentine paths are abandoned in favor of much shorter passageways between the outer edges and the inner edges of the filter discs. Each passageway is now provided with only two 90° turns which serve to trap the particles, as in the first patent, but with significantly less pressure drop. But still there is only about 50% of the circumference of the filter discs that can be devoted to inlet and outlet passages. Consequently, such a filter arrangement cannot be efficiently used for large flows at pressures of 500 psig or more.

In the second of the above-mentioned patents, the center core is omitted, and annular discs are etched to have Y shaped projections arranged in rings to "point" to the center, with the Ys of each ring offset from the next so that each Y points between Ys of the next ring. The result is a tortuous path for the fluid between discs. In other embodiments, other configurations are used instead of the Y shaped projections, with less tortuous paths. But still the filtering action relied upon is swirling flow which causes fine particles to be trapped in crevices of the etched pattern. Any particle not trapped will therefore pass through the filter. It may therefore be necessary to connect two or more such filters in series to completely filter all fine particles.

Another known application for a stack of discs with maze-like passages between the discs is to silence valve noise. When a valve opening is increased, the pressure at the inlet drops momentarily below the new level and then settles at the new level, while fluid velocity through the valve housing surges and then settles back to a constant velocity. This surge creates vibration of the valve "gate," where the term gate is used generically to refer to any of the different types of structures designed to fit against a valve seat to shut off flow through the valve, such as a ball, wedge or cone (needle). This vibration quite naturally creates noise which travels throughout the pipes of the fluid system. Such noise may be intolerable. For example, a submerged submarine running silent must have silent valve operation. It has been previously noted by others that a good way to reduce valve noise is to prevent such surges in fluid velocity, i.e., to maintain constant fluid velocity through the valve as its opening is changed, using a stack of discs with passages between the discs designed to turn the direction of flow through the passages a number of times. This obstruction to flow will keep velocity constant regardless of changes in pressure from inlet to outlet, but will itself cause a pressure drop. Consequently, the pressure provided at the inlet must be increased by the amount of pressure drop across the stacked-disc structure. That is a significant penalty to pay for silencing valve noise because the fluid system to the inlet must be designed for a high pressure, and the continual pressure drop across the stacked-disc structure represents a continual loss of energy. What is required for valve noise silencing is a stacked-disc structure which keeps velocity constant regardless of pressure drop between the inlet and the outlet, and which does not itself cause any significant pressure drop in the fluid flow.

SUMMARY OF THE INVENTION

In accordance with the present invention, a stacked-disc structure is provided for filtering or valve noise silencing with a much greater perimeter than the circumference of a circle of the same diameter by scalloping the outer edge of the discs to very near the inner edges thus forming radial lobes. When the discs are stacked, a hollow cylindrical structure is formed fluted on the outside. The inner edge of each disc is also preferably scalloped slightly into each lobe, leaving a portion between lobes of significant width and reducing the area of the lobes without affecting the outer edge of the lobes. The hollow cylindrical structure is thus also slightly fluted on the outside, though that is not essential for the present invention; the inside core could be a smooth cylinder shape. Passageways from the outer edges of the filter discs to the inner edges are etched to a depth less than the thickness of the discs. For filter applications, the depth is controlled for the smallest size particle to be eliminated from the fluid as it flows through the passageways.

A cylindrical housing for the filter element is fluted shallowly on the inside to retain the stacked discs by the tips of their lobes, leaving all the rest of the space between lobes for fluid flow. The inside of the stacked-disc structure is of such a size as to provide space for fluid flow at least equal to or greater than the sum of the spaces between lobes of the stacked discs, and a sufficient number of discs are stacked to provide a total cross sectional area of passageways between lands at least equal to or greater than the sum of the spaces between lobes, which sum is in turn at least equal to and preferably greater than the smallest of the inlet or outlet of the housing. There is thus little restriction to the flow of fluid through the filter, and the flow of fluid is constant regardless of pressure drop from the inlet to the outlet. Consequently, if the stacked-disc structure is incorporated in the valve, such that the valve housing is the housing for the stacked-disc structure, or if the stacked-disc structure with its own housing is connected to the inlet of the valve housing, the stacked-disc structure will reduce valve noise without itself introducing any significant pressure drop.

The fluid is introduced at one end of the housing to the spaces between lobes and is extracted at the other end of the housing through the hollow core of the structure. This is accomplished by a plate at the outlet (inlet) end of the housing with a central aperture. At the inlet (outlet) end, a similar plate closing the housing is provided with a central aperture and a spacer over the aperture. The spacer is a circular plate scalloped around the edge to provide lobes which match the lobes of the stacked discs. Opposite the stacked discs, and against the inlet (outlet) plate, there are lands which extend over just the spacer lobes, leaving passageways between the lands to the spaces between the lobes of the stacked discs. These lands of the spacer extend toward the axis of the spacer to a circle of a diameter at least equal to or greater than the aperture of the inlet plate. While reference has been made to "inlet" at one end and "outlet" at the other for convenience of description in this summary of the invention, it should be understood that the filter is bilateral, i.e., either end may be the inlet or the outlet as indicated by the alternative in parenthesis.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
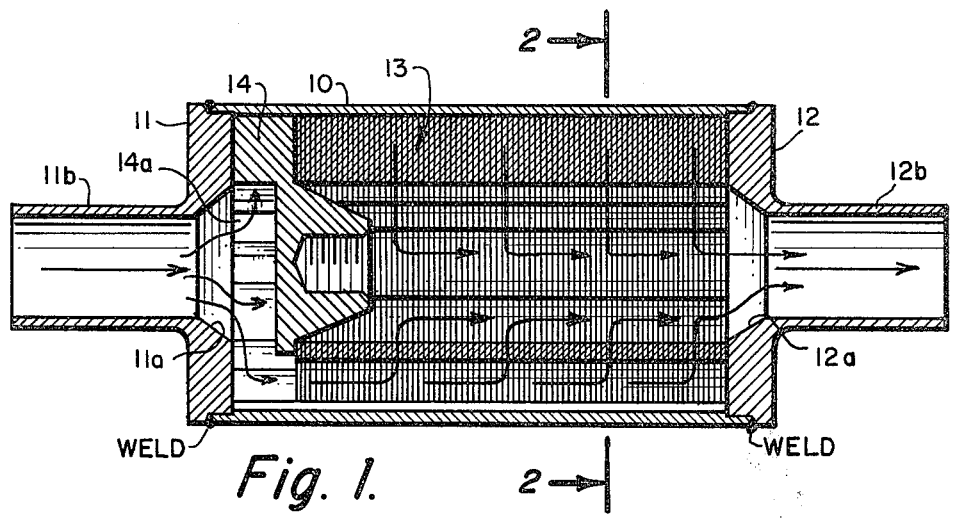
FIG. 1 is a longitudinal section taken along line 1—1 in FIG. 2 of a stacked-disc structure in a housing for use as a filter or valve noise silencer.
Figures 2, 4:
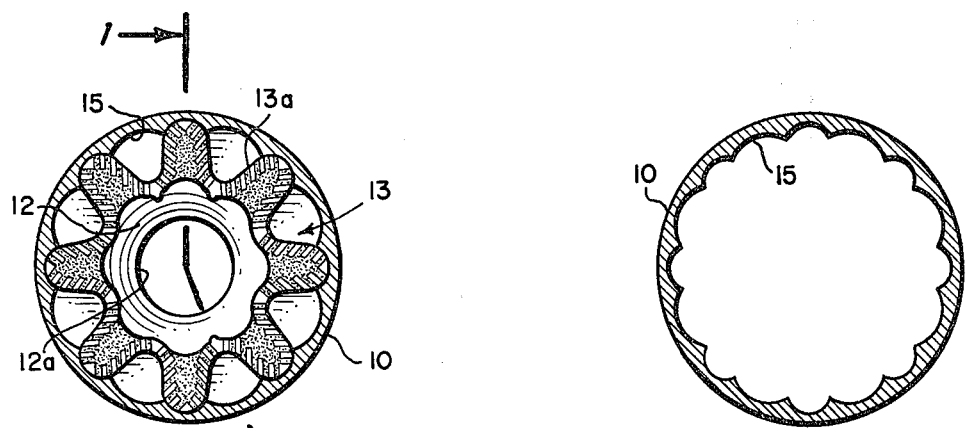
FIG. 2 is a cross section taken along a line 2—2 in FIG. 1 showing the etched face of one of the stacked filter discs, and the manner in which the stack is held by a housing.
FIG. 4 is a cross section of the filter housing taken on a line 4—4 in FIG. 3.
Figure 3:
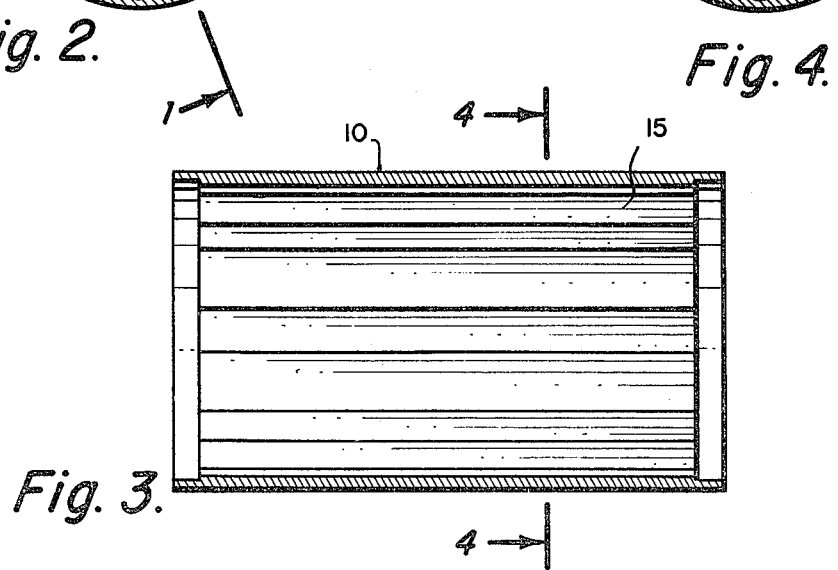
FIG. 3 is a longitudinal section of the filter housing alone.
Figure 5:
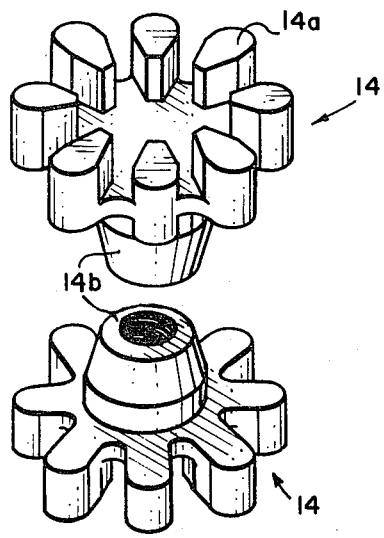
FIG. 5 shows perspective views (front and back) of a spacer at one end of the housing which allows fluid to flow through spaces between lobes of stacked discs, and from there to flow through the discs into the hollow core of the stacked discs and out the other end.
Figure 6:
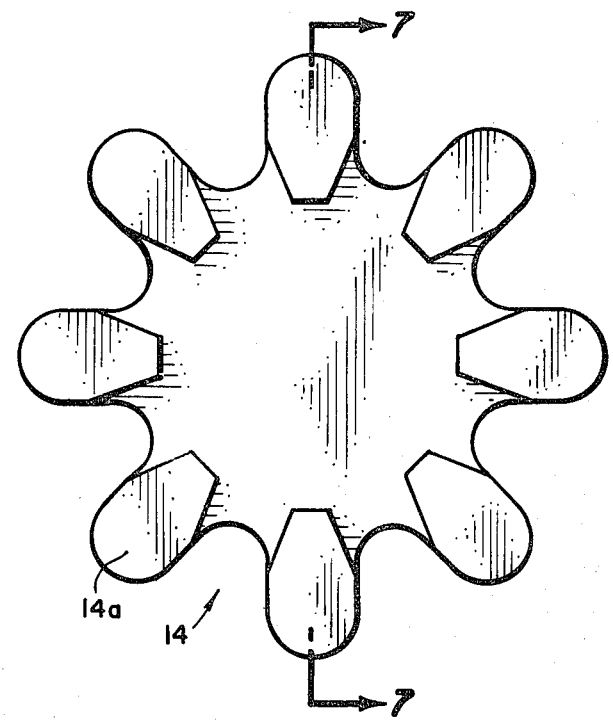
FIG. 6 is a plan view of the face of the spacer shown in FIG. 5.
Figure 7:
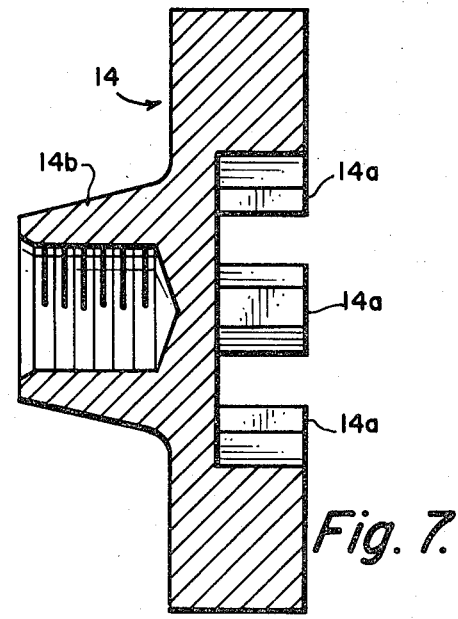
FIG. 7 is a cross section of the spacer taken on a line 7—7 in FIG. 6.

Referring to FIG. 1 of the drawings, which shows a longitudinal section taken on a line 1—1 in FIG. 2, a stacked-disc structure assembled in accordance with the present invention is comprised of: a hollow cylindrical housing 10 shown by itself in FIGS. 3 and 4; two end plates 11 and 12 through which fluid flows into and out of the filter; stacked discs 13; and a spacer 14 of the form shown in FIGS. 5, 6 and 7 which causes fluid that enters through the end plate 11 to flow into spaces between the filter element formed by the stacked discs and the housing. The fluid then flows between the disc through a pattern of passageways etched on the face of each disc, and then through the open center of the stacked discs and out of the end plate 12. This direction of flow illustrated in FIG. 1 is for convenience of explanation; in practice the flow could just as well be in the opposite direction with the same effectiveness.

The discs are essentially annular, but are scalloped around the outer edge to very near the inner edge to form lobes 13a. The discs and the pattern for the passageways are produced by etching the discs out of metal foil from the back and etching the pattern of passageways on the front of each disc, i.e., by etching the front of each disc in each lobe to a controlled depth except for rectangular areas spaced along the outer edge of the lobes with the length of each area disposed at an acute angle with the center line of the lobe. As will be noted more fully hereinafter, each rectangular area (land) is preferably provided with a full radius at each end to minimize turbulence in the flow of fluid between the lands. The spacing between the lands is not critical because when used in a filter element the size of the particles that may flow through the passageways is determined by the depth of the etch, i.e., by the height of the lands, and not the width of the passageways.

The discs are stacked with the lobes aligned to form a fluted cylinder in a manner to be described more fully hereinafter with reference to FIG. 8. The inner wall 15 of the housing 10 is also fluted as shown in FIGS. 3 and 4 to receive the ends of the lobes 13a as shown in FIG. 2. That arrangement leaves ample space between the lobes of the stacked-disc structure and the housing for fluid to flow the full length of the housing. Fluid enters the end plate 11 through an aperture 11a, and around lands 14a (FIG. 5) of the spacer 14 into the spaces between lobes of the stacked-disc structure. At the end of the element, the fluid in the space between the fluid structure and the housing is blocked by the end plate 12. Instead the fluid flows through passages etched on the face of each disc. The fluid then flows into the open center of the filter element and from there through an aperture 12a in the end plate 12.

Figure 9:
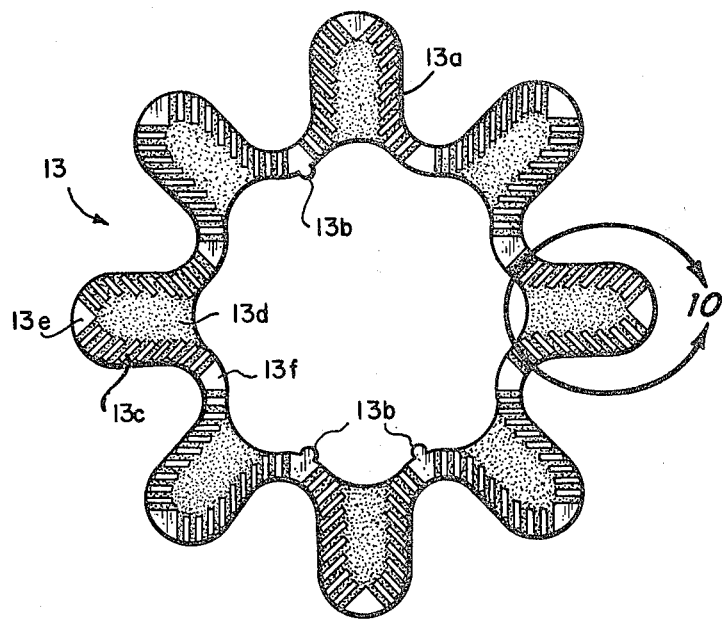
FIG. 9 is an enlarged plan view of the etched face of a disc.

As just noted above, the purpose of the spacer 14 is to provide a baffle in the housing to cause fluid which flows into the housing through the end plate 11 to flow into the spaces between the lobes of the stacked-disc structure and the housing 10. FIG. 6 illustrates the spacer as viewed by the fluid which flows in and around the axis of the spacer and then radially out through spaces between lands 14a of the spacer. The spacer is scalloped in exact conformance with the scalloped outer edge of the discs, as may be better appreciated by comparing the outline of the spacer 14 shown in FIG. 6 with the outline of a disc shown in FIG. 9 to the same scale. Consequently, it is evident that fluid which flows between lands 14a of the spacer will flow into longitudinal spaces formed by lobes of the stacked discs and the housing.

Figure 8:
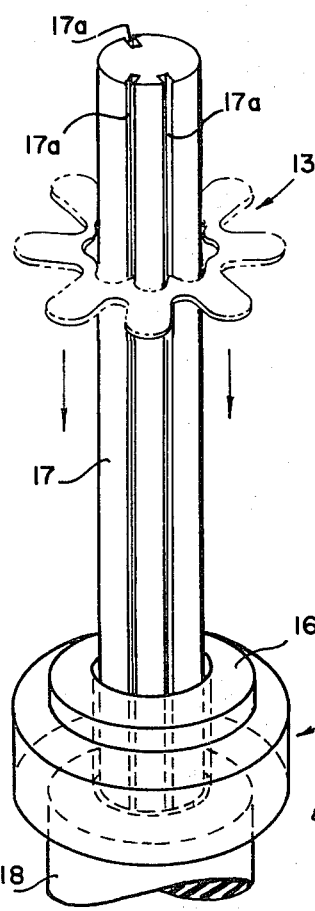
FIG. 8 illustrates the manner in which discs are first stacked with lobes aligned by placing the discs on a mandrel having three axial grooves for receiving three keying projections on the inner edge of the discs.

To stack the discs, a collar 16 shown in FIG. 8 is first placed over a mandrel 17, one end of which is provided with a handle 18. The mandrel has three longitudinal slots 17a positioned to receive three keying projections 13b of the discs. This keying is required while stacking the discs to align the lobes of the discs and to be sure that each disc added to the stack is placed with its etched face in the same direction.

Once the stack has been completed on the mandrel, it is inserted into the housing 10 having the end plate 12 already welded in place. The mandrel is slightly longer than the housing to facilitate stacking the discs since, until "loaded," the loosely stacked discs will occupy more space. Once the stack is inserted into the housing, the collar 16 is used to push all of the discs into the housing. Note that the collar 16 has a reduced diameter portion 16a which will fit into the space inside the housing to be occupied by the spacer. Then the mandrel 17 is extracted, using the collar to hold the stacked discs in the housing. Then the collar is removed and the spacer 14 is inserted with the lands 14a facing away from the discs. The other side of the spacer 14 has a centered portion 14b that is threaded.

The threaded portion 14b of the spacer receives a bolt (not shown) inserted through the other end plate 12. When the bolt is tightened (turned into the threads of the spacer), it pulls the spacer 14 toward the end plate 12 to load (compress) the stack of discs. In practice, a cap (not shown) is placed over the end plate 12 in order for the force of the bolt to be applied directly to the end plate 12, rather than to the plate 12 through a boss 12b into which an outlet pipe (not shown) is welded. While the stack of discs is still under load from the bolt, the other end plate 11 is placed against the spacer 14 and welded. Once that is accomplished, the bolt is removed, and assembly of the filter is complete. A boss 11b is provided on the end plate 11 for an inlet pipe.

The result of this assembly is a stack of filter discs held under pressure by the welded end plates and supported at the outer ends of the lobes of the stacked discs. This arrangement eliminates the central support core required by the prior-art arrangement disclosed in the aforesaid U.S. Pat. No. 3,397,794, and instead provides a hollow core defined by the inner edges of the stacked discs in a manner similar to the aforesaid U.S. Pat. Nos. 3,648,843 and 3,827,568, but with a significant increase in the total area devoted to passage of fluid and a significant decrease in restriction to fluid flow. This is accomplished by scalloping each of the discs along the outer edge and etching one face in a pattern which leaves an array of lands 13c along the scalloped outer edge, as more clearly shown in FIGS. 9 and 10. the lands are essentially rectangular, but rounded at each end with a full radius for smoother flow of fluid around the lands.

Figure 11:
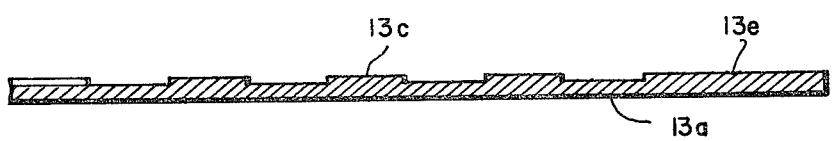
FIG. 11 is a cross section of a disc taken on a line 11—11 in FIG. 10.

The length and width of the lands are not critical, but it is preferable for each land to be longer than it is wide. The spacing between lands is also not critical; a spacing about equal to the width of the lands is adequate. For filter applications, it is the depth of the etched passageways that determines the size of particles to be filtered. In practice, the depth of each etched passageway will be much smaller than the width, as shown in FIG. 11, so that only the depth of the etch will control the size of the particles filtered. The depth of the etch can be controlled to a high degree of accuracy (in the micron range of at least 1 to 35 microns) using conventional photoresist techniques commonly used in the semiconductor industry by simply controlling the time and temperature of the etching.

The pattern of lands along the scalloped edges of the disc more than doubles the total surface area around the disc through which passages may be provided in a disc of predetermined outer diameter. As a consequence, more than half that total area may be devoted to lands, and still have a total area devoted to passageway for fluid about equal to or greater than the total circumferential area of the disc. In that manner the total fluid passage is maximized. Filtering in this arrangement is affected not by trapping particles but by restricting the particles at the entrance between filter discs, so the passages may be straight for minimum impedance to fluid flow, which results in minimum pressure drop of fluid through the stacked-disc structure.

Figure 10:
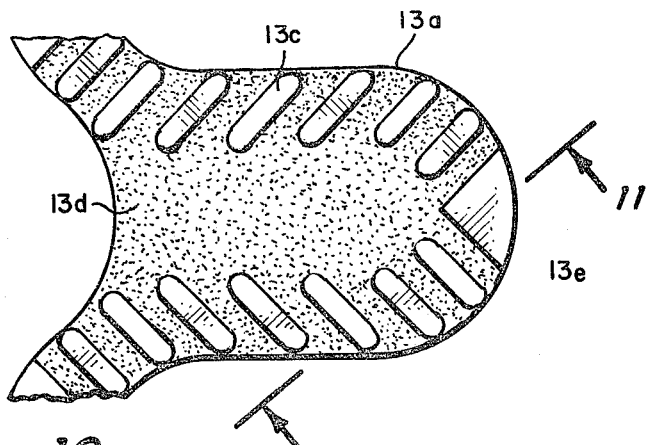
FIG. 10 is an enlarged fragmentary view of a portion of a disc indicated in FIG. 9.

In the preferred embodiment disclosed, eight lobes are provided for each disc such that the center line of each extends along 45° radial lines, and the lands are oriented with their lengths at 45° with the center lines of the lobe (as shown in FIG. 10), but that is not essential. Any number of lobes may be provided and the lands may be oriented at any convenient acute angle. The flow between lands is thus angled toward the center line of the lobe and the center of the stack.

The lands 13c along the serpentine edges of the discs are aligned in the stack so that the loading pressure is transferred from one disc to the next only through the lands, and no pressure is applied to the disc in the space between the lands. The webs between the lands thus serve only to block the passage of particles. If only the web between the lands were left, and all other material in the lobes 13a were etched out, the stacked-disc structure would function as intended, but only at low pressures. At high pressures, the discs (which are then more serpentine than annular) may collapse inwardly. Once that occurs, the discs become disarrayed with large gaps between them. To prevent failure of such a stacked-disc structure at high pressure, a web 13d is left between the lands 13c along the serpentine edge of the lobes 13a of the filter disc 13, as shown in FIG. 10. Note that a large area (triangular) land 13e is left on the tip of each lobe to effectively clamp the tips of the lobes in the stack. That aids the web 13d to prevent any collapse of the stack. Note also the large area (keystone shaped) lands 13f (FIG. 9) between the lobes 13a which are left to effectively clamp the discs between the lobes. These areas of the disc between the lobes may be reinforced by leaving some web behind it, i.e., between the lobes, but that should always be a minimum since any web retained in those areas decreases the area of fluid flow along the outside of the stacked-disc structure.

This stacked-disc structure may be readily used to reduce valve noise by connecting it at the inlet of the valve housing, or incorporating the stacked-disc structure in the valve housing. To incorporate the stacked-disc structure in the housing of a valve, the valve seat may serve as the outlet of the stacked-disc structure. The valve stem may then pass through a seal in the valve housing directly opposite the valve seat, which is to say in the plate 11. An inlet could then be incorporated into the plate 11 next to the valve stem seal. In that case the hollow core should be of sufficient diameter to provide full passage for fluid flow with the valve stem inserted, i.e., the cross section of the hollow core should be increased by an amount equal to the cross section area of the valve stem.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A stacked-disc structure comprising
 a stack of annular discs shaped around their outer edge to provide lobes, each disc being etched in one face to provide lands that define straight passageways in each lobe from the outer edge into a common passageway extending from near the tip of the lobe to a hollow core, each of said discs being stacked to place the etched face thereof against an unetched face of the next disc, and with said lands aligned,
 housing means for retaining said stacked discs within an enclosure by the tips of their lobes, leaving spaces between lobes for fluid flow through said housing means, said housing means including apertures for fluid into and out of said housing means,
 means at one end of said stack of annular discs for permitting fluid to flow freely only into said spaces between said stack and said housing means, and
 means at the other end of said stack of annular discs for preventing fluid flow from exiting said spaces between said lobes and said housing means except through straight passageways and common passageways between discs, and then through said hollow core.

2. A stacked-disc structure as defined in claim 1 wherein said hollow core is of such a size as to provide space for fluid flow at least equal to or greater than the sum of spaces between lobes of said stacked discs, and a sufficient number of discs are stacked to provide a total cross sectional area of passageways between lands at least equal to or greater than the sum of spaces between lobes.

3. A stacked disc structure as defined in claim 1 or 2 for use as a filter wherein said passageways in said lobe are etched to a depth effective in filtering a specific size particle from said fluid flow.

4. A stacked-disc structure comprising
 a stack of annular discs, each disc having a substantially circular opening in the center and an outer edge that fluctuates in distance from said circular opening in the center to provide tips at the outer edge of said fluctuations, each disc having a face identically etched to a predetermined depth except for elongated areas extending inwardly around said perimeter to a limited extent, thereby leaving aligned lands in the stack of discs with passageways for fluid between lands of each disc,
 a housing for said stack of discs, said housing having an inside surface fluted shallowly to conform to the tips of the disc fluctuations thereby to secure said discs in an aligned relationship, and leave spaces between tips of said stack of discs and said housing, said housing including apertures for fluid flow into and out of said housing,
 means at one end of said stack of annular discs for permitting fluid to flow only into said spaces between said tips of said stack of discs and said housing, and
 means at the other end of said stack of annular discs for preventing fluid flow from exiting said spaces between said tips of said stack of discs and said housing except through passageways between lands of said stacked discs and said substantially circular opening at the center of said stack of discs.

5. A stacked-disc structure as defined in claim 4 wherein said discs are provided with large area lands at the tips and large area lands in the narrow portions thereof between said tips to share said axial load with the aligned peripheral lands which provide passageways for fluid.

6. A stacked-disc structure as defined in claim 4 or 5 wherein said fluctuations are substantially sinusoidal, thereby providing lobes with rounded tips and curved narrow portions between tips.

7. A stacked-disc structure as defined in claim 6 wherein said peripheral lands along each side of each lobe between the tip thereof and a narrow portion are parallel elongated lands each disposed at an acute angle with a center line of said lobe to provide fluid flow toward said center line and toward the disc center.

8. In a stacked-disc structure, the combination of
 a stack of annular discs, each disc being scalloped along its outer edge to form a plurality of lobes which are aligned in the stack, each disc being etched on one face to form spaced apart lands along the edge of said lobes, whereby the etched face of a disc against the unetched back of the next disc in the stack forms passageways between the lands for the flow of fluid from spaces between lobes outside said stack to the hollow core inside said stack,
 housing means for supporting said stack of discs at the tips of said lobes and for providing a spaces between lobes for fluid flow,
 a first plate at one end of said stack of discs with an aperture for free flow of fluid from the hollow core of said stack of discs to the outside of said housing means, said first plate cooperating with said housing means to prevent fluid flow from said spaces between lobes to the outside of said supporting and housing means, a second plate at the other end of said stack of discs with passages for free flow of fluid into said spaces between lobes outside said stacked discs from the outside of said supporting and housing means, and a spacer tight between said second plate and said stacked discs, said spacer being circular with a scalloped edge conforming to and aligned with said lobes of said stacked discs, and having lands on the side thereof opposite said stacked discs, one land aligned opposite each lobe of said stacked disc, whereby fluid passing through said second plate also passes around said lands of said spacer and through said spaces between said lobes of said stacked discs.

9. The combination as defined in claim 8 wherein said etched passages are in the range from 1 to 35 microns.

10. The combination as defined in claim 9 wherein each disc is made of any metal which can be formed into foil and chemically etched to a desired shape and depth and thereby provide the desired pattern of lands.

* * * * *

UNITED STATES PATENT AND TRADEMARK OFFICE
CERTIFICATE OF CORRECTION

PATENT NO. : 4,410,430

DATED : October 18, 1983

INVENTOR(S) : Ray Hagler, Jr.

It is certified that error appears in the above-identified patent and that said Letters Patent are hereby corrected as shown below:

Line 4 of the Abstract, "13a" should be - - 13c - -.

Col. 5, line 9, delete "fluid" at the end of the line and substitute
- - fluted - -.

Signed and Sealed this

Sixteenth Day of April 1985

[SEAL]

Attest:

DONALD J. QUIGG

Attesting Officer     Acting Commissioner of Patents and Trademarks